(12) United States Patent
Kim

(10) Patent No.: US 6,636,565 B1
(45) Date of Patent: Oct. 21, 2003

(54) METHOD FOR CONCEALING ERROR

(75) Inventor: Eung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/481,868

(22) Filed: Jan. 12, 2000

(30) Foreign Application Priority Data

Jan. 12, 1999 (KR) .............................................. 99-583

(51) Int. Cl.$^7$ ................................................. H04N 7/32
(52) U.S. Cl. ................................................. 375/240.27
(58) Field of Search ................................. 348/607, 616; 375/240.12–240.16, 240.18, 240.2, 240.24, 240.26, 240.27; 382/266; H04N 7/32

(56) References Cited

U.S. PATENT DOCUMENTS

| | | | | |
|---|---|---|---|---|
| 5,228,028 A | * | 7/1993 | Cucchi et al. ......... | 375/240.12 |
| 5,247,363 A | * | 9/1993 | Sun et al. ................ | 348/607 |
| 5,365,604 A | * | 11/1994 | Kwok et al. ............. | 382/266 |
| 5,550,847 A | * | 8/1996 | Zhu ........................ | 375/240.13 |
| 5,559,558 A | * | 9/1996 | Kitazato ................. | 375/240.12 |
| 5,621,467 A | * | 4/1997 | Chien et al. ........... | 375/240.24 |
| 5,715,008 A | * | 2/1998 | Sekiguchi et al. ...... | 375/240.15 |
| 5,724,369 A | * | 3/1998 | Brailean et al. ........ | 348/616 |
| 5,727,088 A | * | 3/1998 | Kim ....................... | 375/240.16 |
| 5,751,361 A | * | 5/1998 | Kim ....................... | 375/240.12 |
| 5,912,707 A | * | 6/1999 | Kim ....................... | 375/240.27 |
| 5,936,674 A | * | 8/1999 | Kim ....................... | 375/240.27 |

* cited by examiner

Primary Examiner—Richard Lee
(74) Attorney, Agent, or Firm—Birch, Stewart, Kolasch & Birch, LLP

(57) ABSTRACT

A moving picture compression/decompression system utilizes a method for concealing errors in a received picture. A macro block, lost due to an error, is compensated using either a temporal or spatial prediction method, depending upon the type of frame and the characteristics of the picture. Thus, the displayed picture quality can be significantly improved.

9 Claims, 6 Drawing Sheets

METHOD FOR CONCEALING ERROR

BACKGROUND OF THE INVENTION

1. Field of the Invention

The present invention relates to a moving picture compression/decompression system and more particularly to a method for concealing errors in a moving picture compression/decompression system.

2. Discussion of Related Art

Utilizing digital signal processing technology, many systems have been proposed to compress and transmit a large amount of moving picture information through a transmission channel of a limited bandwidth. In moving picture standards such as MPEG, H.261 and H.263, re-synchronization due to channel errors is performed in units of a slice. Each slice consists of a plurality of macro blocks and each macro block is the unit for motion compensation decoding. A single frame generally includes many slices depending upon the size of an image. When an error is generated in such a slice, all information in the slice with the error is lost.

Also, moving picture coding methods use both variable length coding and motion compensation coding. In such case, an error in a bit of a bit stream results in the loss of a considerable portion of the picture information and continuously affects the frames following. Accordingly, a severe deterioration in picture quality results when a decoder decodes a bit stream with an error. To solve this problem, numerous methods for error concealment using neighboring information to restore the lost information have been proposed.

Typical error concealing methods include a temporal prediction error concealing method and a spatial prediction error concealing method. The temporal prediction error concealing method compensates a lost picture block using a motion vector in the time domain. Referring to FIGS. 1A and 1B, the temporal prediction error concealing method replaces a lost macro block E1 of a current frame CF by a macro block E'1 of a previous frame PF located in the same position. Although this method is relatively simple and can quickly compensate a lost block, the accuracy of the compensated block is not high. The temporal prediction concealing method especially results in low performance when there is fast motion or irregular motion between two continuous frames.

To obtain more accurate motion vectors for the temporal prediction error concealing method, a block boundary matching method has been recently used. This method utilizes the boundary pixels surrounding the lost macro block for block matching. Although performance is satisfactory when there is no large change in pixel values across the boundary, the block boundary matching does not result in satisfactory performance at the edge or corner of the picture. Moreover, for interlaced sequence, the conventional methods result in poor performance because spatial correlation is low between fields having different parities. Especially, when there is a scene change, the visual picture quality deteriorates significantly.

The spatial prediction error concealing method compensates a lost picture block by the interpolation of the neighboring blocks in the spatial domain. This method performs a spatial interpolation for a lost block E1 using neighboring blocks C1, C2 and C3 of the current frame CF. Because a linear interpolation results in a deterioration of the resolution near the edge, interpolation filtering according to a direction component of the edge is employed. However, such interpolation requires an apparatus for extracting and distinguishing each direction component of the edge, and requires a significant amount of calculation as compared to the conventional linear interpolation filtering.

Still another error compensation method is based on projection and guarantees good picture quality performance when the damaged macro block is sufficiently smaller than the picture. However, a great amount of calculation at the receiver is required.

Particularly, when image sequences have a strong temporal correlation, the performance of the spatial prediction concealing method is inferior to that of the temporal prediction concealing method. However, when a severe variation between pictures such as a scene change occurs, the spatial prediction compensation is preferable to the temporal prediction compensation. Therefore, a method for deciding whether the information of lost macro block E1 should be compensated by a spatial prediction method using surrounding blocks C1–C4, or replaced by the information of macro block E1 that is the most analogous to the lost macro block E1 is required.

SUMMARY OF THE INVENTION

Accordingly, an object of the present invention is to solve at least the problems and disadvantages of the related art.

An object of the present invention is to provide a method for accurately and efficiently concealing errors, thereby preventing deterioration of the picture quality at the receiver.

Additional advantages, objects, and features of the invention will be set forth in part in the description which follows, and in part will become apparent to those having ordinary skill in the art upon examination of the following, or may be learned from practice of the invention. The objects and advantages of the invention may be realized and attained as particularly pointed out in the appended claims.

To achieve the objects and in accordance with the purposes of the invention, as embodied and broadly described herein, a method for concealing errors includes extracting the type of a frame in which an error is currently generated and extracting the characteristics of the picture; selecting an error concealing method to use according to the frame type and picture characteristics; replacing the frame with the error by a block in which errors are concealed, according to the judged error concealing method; and performing a post-process for the replaced block, to remove visual block deterioration generated between neighboring blocks.

A spatial prediction error concealing method is selected when the frame with an error has a weak temporal correlation, such as a scene change, and a temporal prediction error concealing method is selected when there is a strong temporal correlation in the frame. Also, the spatial prediction error concealing method uses a frequency interpolation method by which blocks surrounding the lost block are interpolated in the frequency domain in the current frame using a spatial correlation between the blocks surrounding the lost block.

The frequency interpolation method according to the present invention comprises dividing each block surrounding a lost block into subblocks and DCT-converting the subblocks neighboring the lost block; re-dividing the DCT-converted subblocks and re-DCT-converting the re-divided subblocks to estimate the average value of the lower frequency band coefficients; and reverse DCT-converting the estimated average value of the coefficients into subblocks and estimating the lost block to reconstruct it.

In the present invention, the temporal prediction error concealing method uses a new cost function to estimate a block from a previous frame that would most closely agree with the lost block in order to compensate the error.

BRIEF DESCRIPTION OF THE ATTACHED DRAWINGS

The invention will be described in detail with reference to the following drawings in which like reference numerals refer to like elements wherein.

DETAILED DESCRIPTION OF THE EMBODIMENT

Reference will now be made in detail to the preferred embodiments of the present invention, examples of which are illustrated in the accompanying drawings.

Figure 1A:
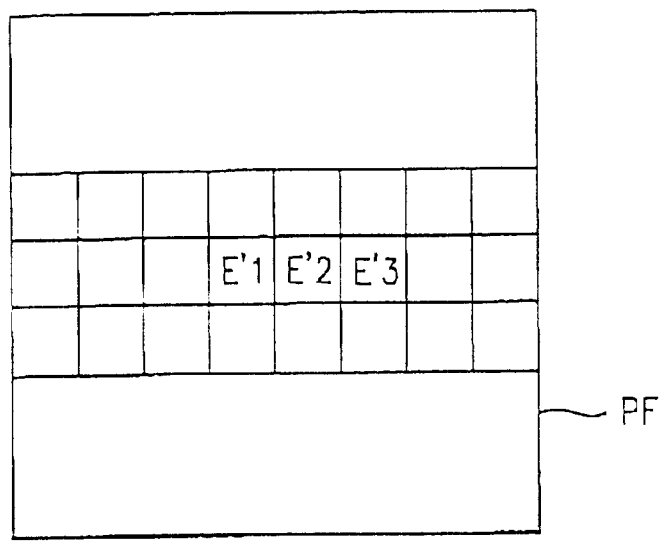
FIGS. 1A and 1B illustrate error concealment methods in the related art.
Figure 1B:
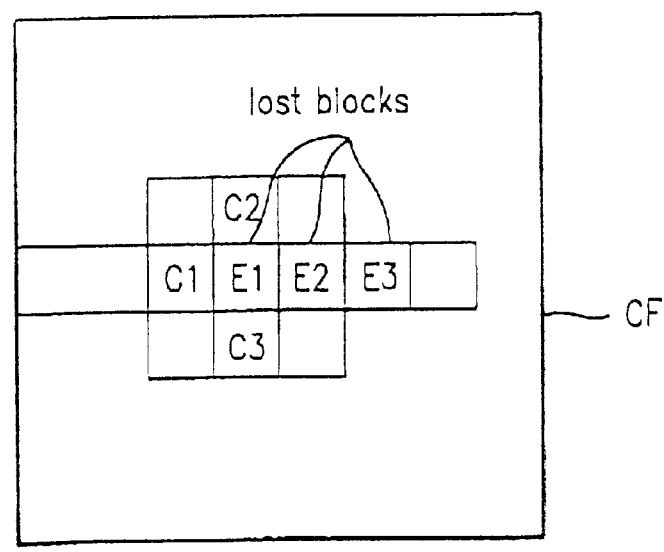
Figure 2:
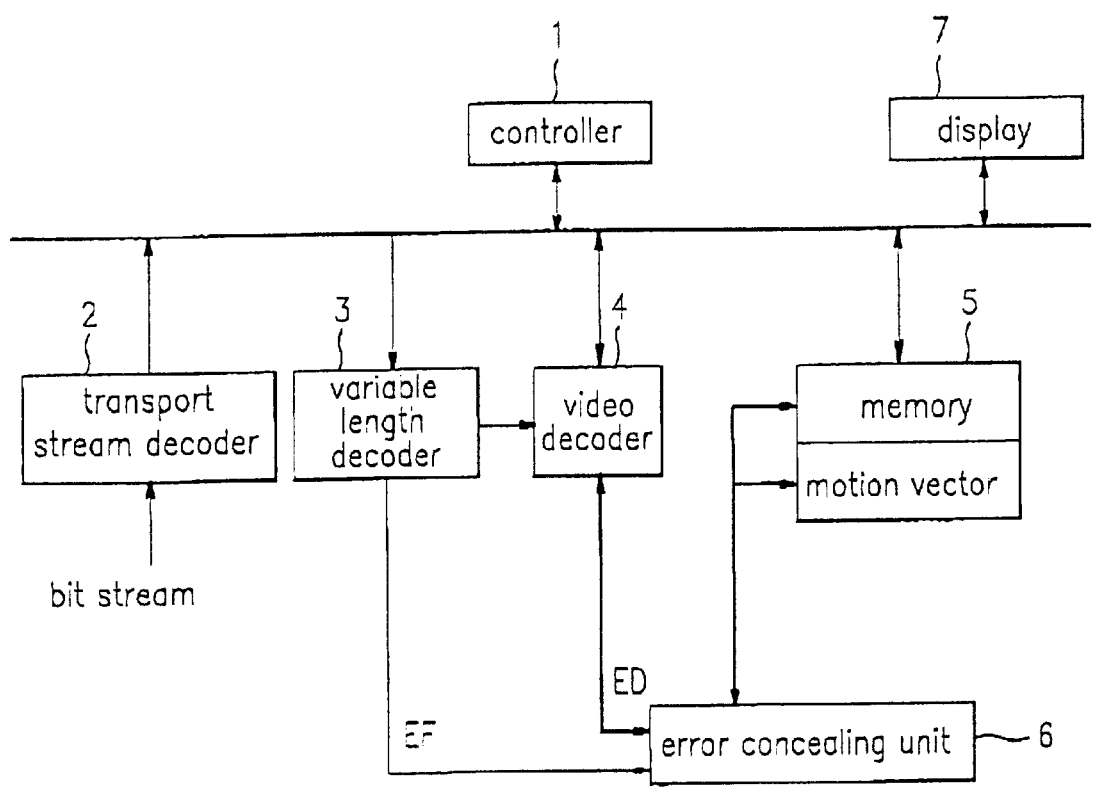
FIG. 2 is a block diagram of an error concealing apparatus according to present invention.

FIG. 2 is a block diagram of an error concealing apparatus according to the present invention including a controller 1 which controls the operation of the entire circuit; a transport stream decoder 2 which decodes a bit stream according to a control signal from the controller 1; a variable length decoder 3 which decodes the transport stream decoded by the transport stream decider 2 in a variable length and adds an error flag when an error is generated; a video decoder 4 which decodes the signal decoded by the variable length decoder 3 into a video signal, stores the video signal in a memory 5, and displays the video signal through a display 7; and an error concealing unit 6 which conceals and compensates an error according to the error flag inserted by the variable length decoder 3.

As discussed above, a picture is divided, into macro blocks, each having a size of 16×16, and several macro blocks form a slice. When an error is generated in a slice, several macro blocks may continuously be lost. To conceal and compensate the error due to the lost blocks, the transport stream decoder 2 sets a value of "1" to a transport_error_indicator signal of a bit stream which passes through a channel decoder according to a control signal from the controller 1 when an error is generated. Here, the channel decoder may be a Reed-Solomon coder or forward error correction coder. The video decoder 4 then adds a sequence_error_start_code to the transport stream according to the signal from the transport stream decoder 2 to output a video stream.

Thereafter, the variable length decoder 3 decodes the signal from the transport stream decoder 2 in a variable length according to the sequence_error_start_code of the video decoder 4 and outputs a decoded signal when an error is not generated. On the other hand, the variable length decoder 3 adds an error flag Error_Flag (EF) to the decoded signal when an error occurs. That is, the variable length decoder 3 decodes the signal from the transport stream decoder 2 in the variable length, and outputs the error flag signal EF when a syntax error or a semantic error is generated in the video stream.

The video decoder 4 decodes the video stream in which an error has not been generated in the variable length decoder 3 and stores the decoded video stream in the memory 5. For a video stream in which an error has been generated, the video decoder 4 outputs the address of the video stream as an error data (ED). The error concealing unit 6 extracts motion information and pixel information of neighboring blocks normally reconstructed from the memory 5 to conceal the blocks lost in a current frame according to the error flag EF from the variable length decoder 3 and the error data ED from the video decoder 4. The video stream with an error concealed is then decoded by the video decoder 4 to be displayed on the display 7.

Figure 3:
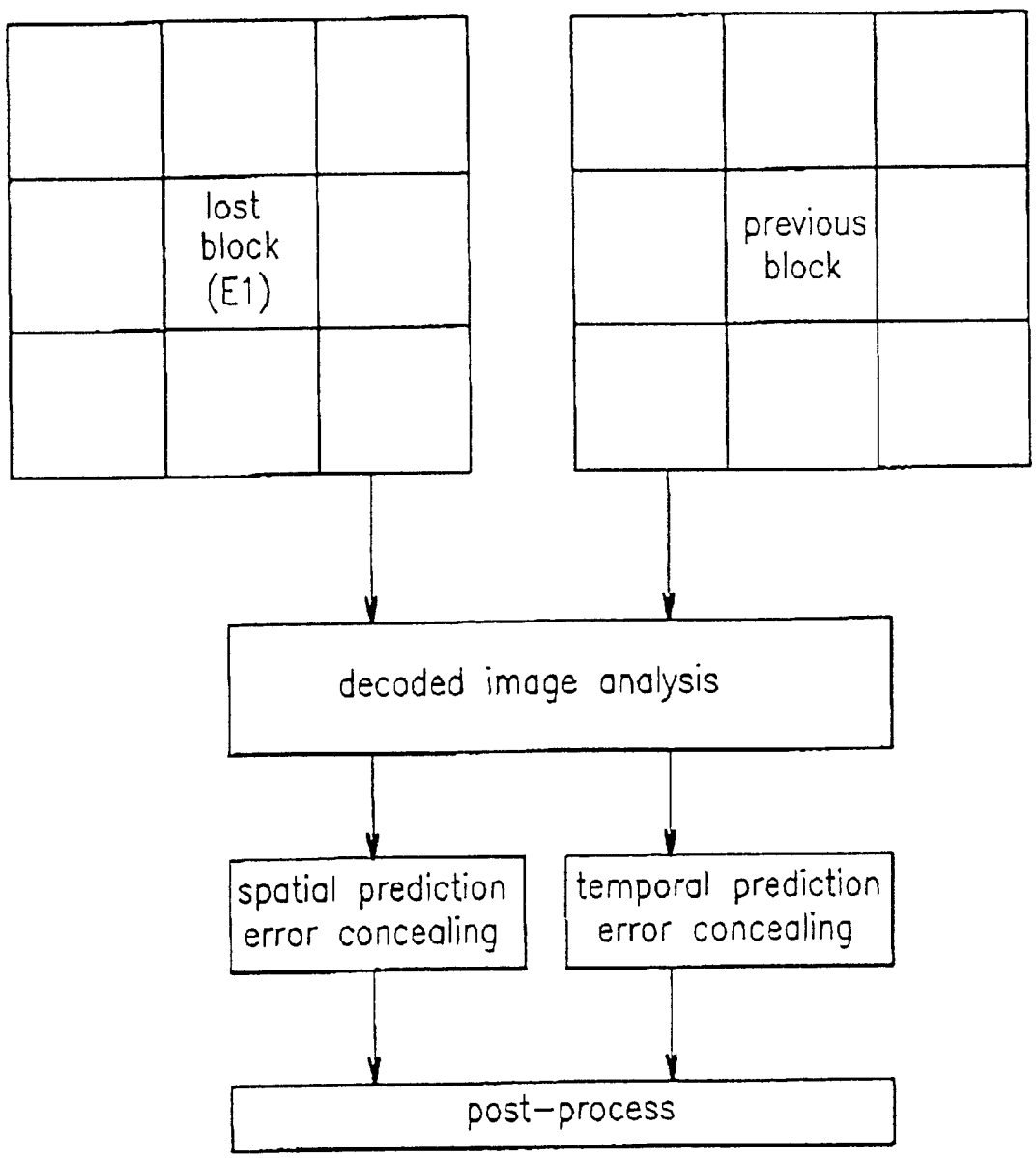
FIG. 3 shows linear prediction block boundary matching method according to an error concealing method of the present invention.
Figure 4:
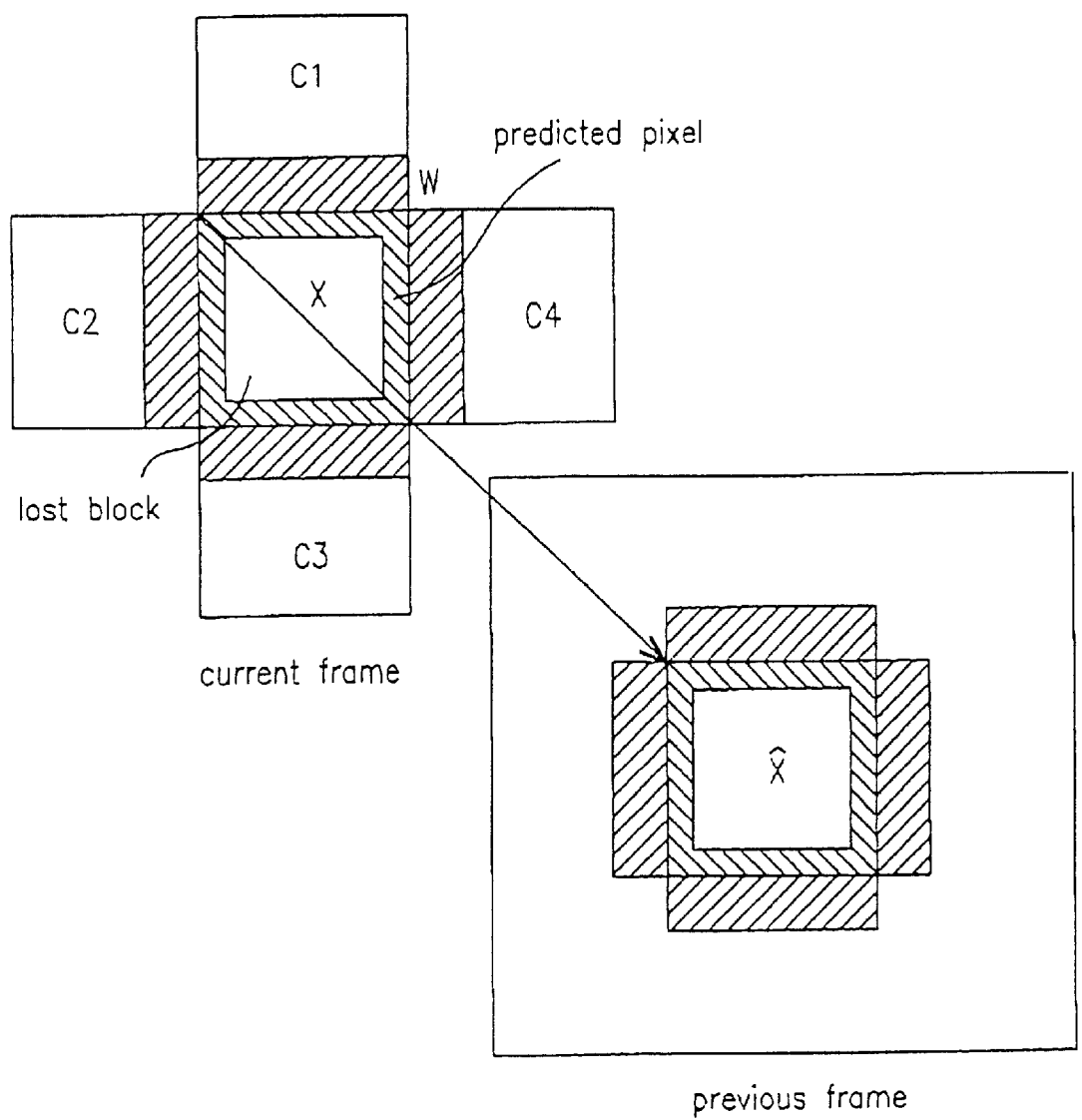
FIG. 4 shows a temporal prediction error concealing method according to the present invention.
Figure 5:
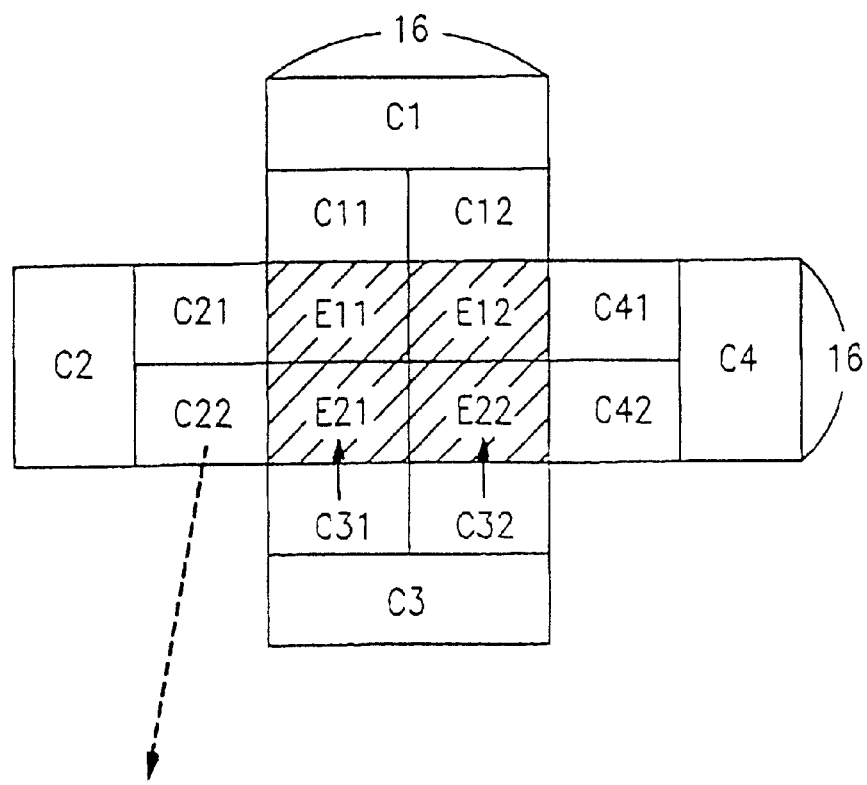
FIG. 5 shows a spatial prediction error concealing method according to the present invention.
Figure 5:
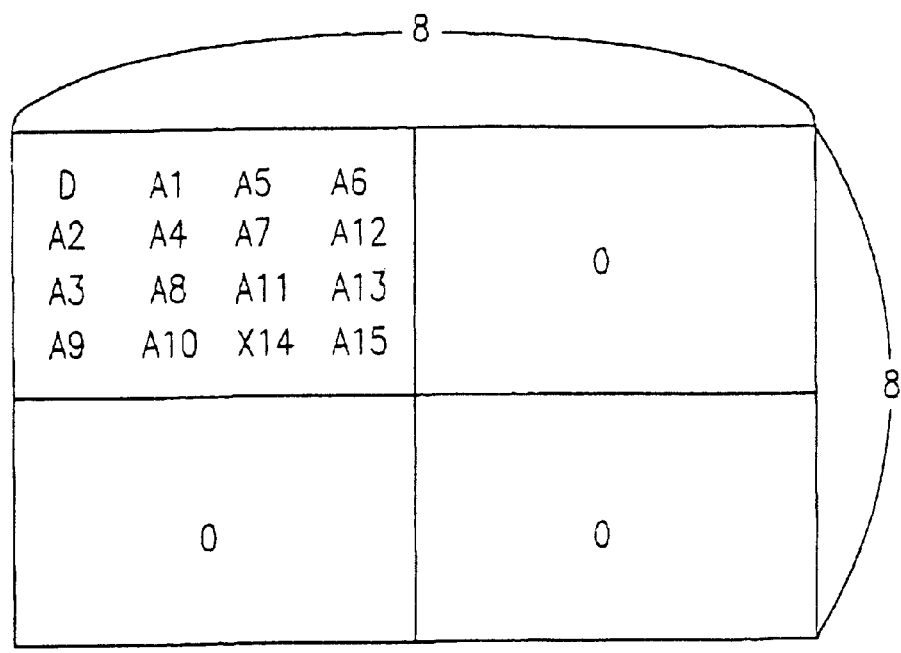
Figure 6:
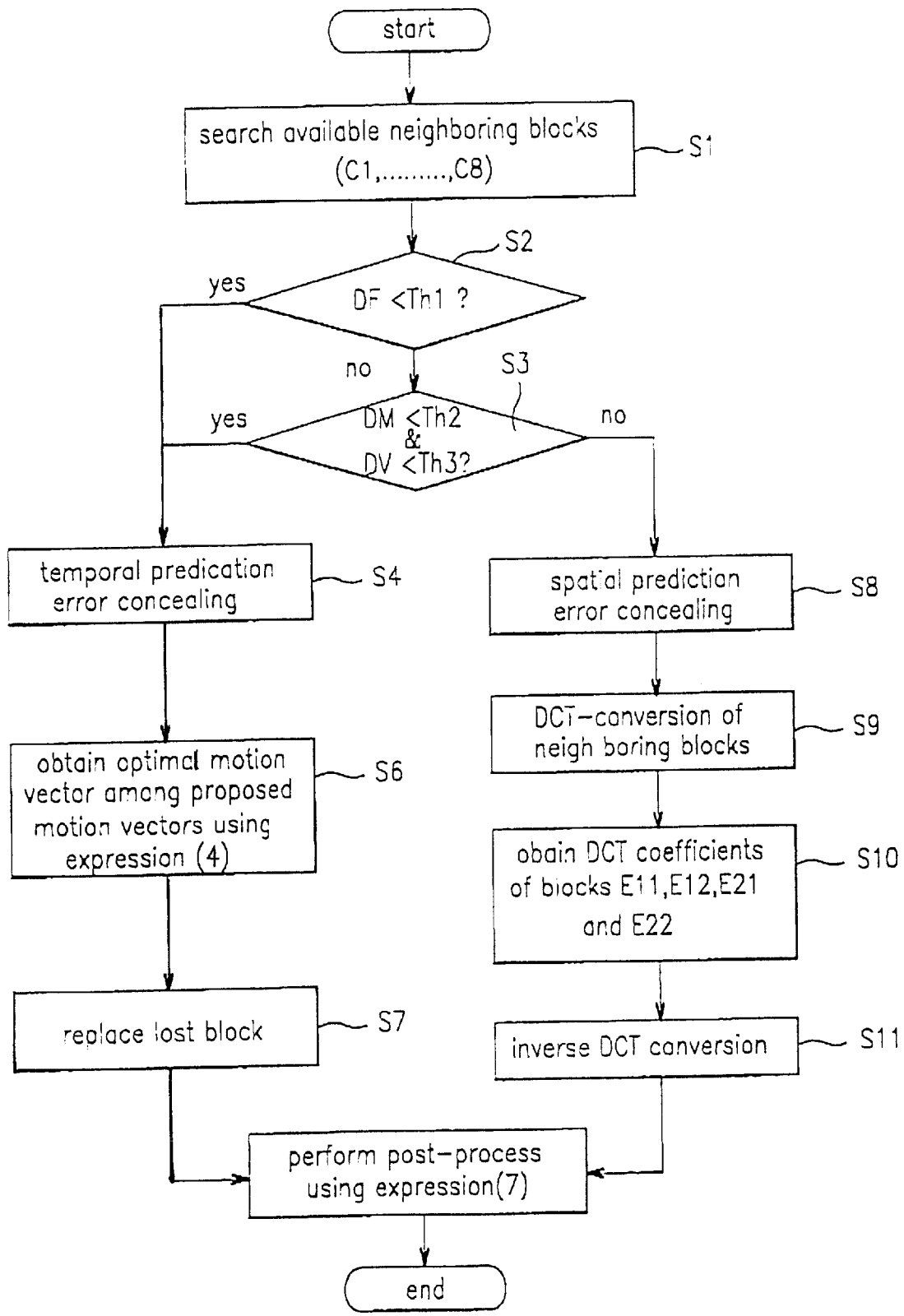
FIG. 6 is a flow chart of the error concealing method according to the present invention.

The error concealing method will be explained below with reference to the FIGS. 2–6, where FIG. 3 shows a linear prediction block boundary matching method according to an error concealing method of the present invention, FIG. 4 shows a temporal prediction error concealing method according to the present invention, FIG. 5 shows a spatial prediction error concealing method according to the present invention, and FIG. 6 is a flow chart showing the error concealing method according to the present invention.

First, because several macro blocks are lost when an error is generated in a slice, the controller 1 selects blocks which are available, i.e. neighboring blocks without errors. For example, if one macro block is lost, information of the top, left, bottom and right blocks C1, C2, C3 and C4 are available, as shown in FIG. 4. The controller 1 searches for coding modes of available neighboring blocks in the current frame to determine characteristics of the bit stream currently being decoded. Thus, the controller applies a suitable error concealing method according to the characteristic of the picture being decoded by the video decoder 4 (step S1).

The characteristic of the picture being decoded is obtained by a decoded image analysis using information such as image statistics, coding modes, motion vectors and error analysis, as shown in FIG. 3. Particularly, the controller 1 obtains the difference between the current frame and the previous frame with respect to the blocks surrounding the lost block using Equation [1], where $C_t(k)$ for $\{k=1, \ldots, m\}$ represent macro blocks surrounding the block lost at time t and m indicates the number of available surrounding blocks.

$$DF = \sum_{k=1}^{m} |C_t(k) - C_{t-1}(k)| \qquad [1]$$

The controller 1 employs the temporal prediction error concealing method when the calculated DF is less than a predetermined reference value (step S2). When the DF exceeds the reference value, the controller 1 obtains a mean and a variance of the neighboring blocks, i.e. the blocks surrounding the lost block, using Equations [2] and [3], where $MF_t$ and $MF_{t-1}$ are the mean values whale $VF_t$ and $VF_{t-1}$ are the variance values of the neighboring blocks of a frame including the lost block at time t and of a previous frame at time (t−1), respectively.

$$MF_t = \frac{1}{M}\sum_{k=1}^{m} \text{mean}(C_t(k)),\ MF_{t-1} = \frac{1}{M}\sum_{k=1}^{m} \text{mean}(C_{t-1}(k)) \qquad [2]$$

$$VF_t = \frac{1}{M}\sum_{k=1}^{m} \text{var}(C_t(k)), \; VF_{t-1} = \frac{1}{M}\sum_{k=1}^{m} \text{var}(C_{t-1}(k)) \quad [3]$$

If a difference of the mean value DM=|MF$_t$-MF$_{t-1}$| and a difference or the variance value DV=|VF$_t$-VF$_{t-1}$| are within threshold values, the controller 1 determines that the frame does not include a scene change and selects the temporal prediction error concealing method (steps S3 and S4).

In the temporal prediction error concealing method, an optimal motion vector (V$_x$*, V$_y$*) which has the smallest error among a set (S) of all available motion vectors (V$_x$, V$_y$) is estimated from the previous frame, and the lost block is then replaced by the block obtained from the previous frame using the optimal motion vector. The optimal motion vector may be calculated by the cost function of Equation [4] below, $$(V_x^*, V_y^*) = \arg\min(V_x, V_y) \in S \sum_{S=1}^{4} D_{ij}^s(V_x, V_y) + \lambda E_{ij}^s(V_x, V_y) \quad [4]$$

where $$D_{ij}^1(V_x, V_y) = \sum_{k=0}^{N-1}\left(x^1(i+k+V_x, j+V_y) - \sum_{m=0}^{\omega} a_m^1 x(i+k, j-m)\right)^2$$

$$D_{ij}^2(V_x, V_y) = \sum_{k=0}^{N-1}\left(x^1(i+V_x, j+k+V_y) - \sum_{m=0}^{\omega} a_m^2 x(i-m, j+k)\right)^2$$

$$D_{ij}^3(V_x, V_y) = \sum_{k=0}^{N-1}\left(x^1(i+k+V_x, j+N-1+V_y) - \sum_{m=0}^{\omega} a_m^3 x(i+k, j+m+N-1)\right)^2$$

$$D_{ij}^4(V_x, V_y) = \sum_{k=0}^{N-1}\left(x^1(i+N-1+V_x, j+k+V_y) - \sum_{m=0}^{\omega} a_m^4 x(i+m+N-1, j+k)\right)^2$$

$$E_{ij}^1(V_x, V_y) = \sum_{k=0}^{N-1}(x^1(i+k+V_x, j+V_y-1) - x(i+k, j-1))^2$$

$$E_{ij}^2(V_x, V_y) = \sum_{k=0}^{N-1}(x^1(i+V_x-1, j+k+V_y) - x(i-1, j+k))^2$$

$$E_{ij}^3(V_x, V_y) = \sum_{k=0}^{N-1}(x^1(i+k+V_x, j+N+V_y) - x(i+k, j+N))^2$$

$$E_{ij}^4(V_x, V_y) = \sum_{k=0}^{N-1}(x^1(i+N+V_x, j+k+V_y) - x(i+N, j+k))^2.$$

In equation [4], x(i,j) represents luminance values of pixels of top, sides, and bottom blocks adjacent to the lost block, and x$^1$(i,j) represents luminance values of pixels in the previous frame, corresponding to x(i,j). Also, (i,j) indicates the location of the lost macro block of the picture, N indicates the size of the macro block and s={1,2,3,4} represents the neighboring macro blocks. Moreover, a$_m^s$ is the mth coefficient of the linear predictor in the macro block at location s, and W is the number of pixel lines used for a comparison (that is, the number of linear prediction coefficients). In addition, D$^s_{ij}$(V$_x$, V$_y$) for {S=1,2,3,4} indicates the difference between pixel values corresponding to the previous frame and values estimated from values of pixels surrounding the current lost block, while E$^s_{ij}$(V$_x$, V$_y$) for {S=1,2,3,4} is an additional cost function, which represents, the difference between pixels surrounding the currently lost block and pixels surrounding the previous frame block corresponding to the lost block, and λ is a constant controlling the additional cost function. Finally, arg min (V$_x$, V$_y$)∈S indicates a value of (V$_x$, V$_y$) that, in turn, produces the smallest value from a set of available motion vectors (V$_x$, V$_y$) from the expression (D$^s_{ij}$(V$_x$, V$_y$+λE$^s_{ij}$(V$_x$, V$_y$)).

Here, the coefficient of a linear predictor is calculated using Equation [5], where a pixel vector in each neighooring block is represented by Equation [6].

$$\begin{pmatrix} a_1^s \\ a_2^s \end{pmatrix} = \begin{pmatrix} \overline{x}_2^{s^T} \overline{x}_2^s & \overline{x}_2^{s^T} \overline{x}_3^s \\ \overline{x}_3^{s^T} \overline{x}_2^s & \overline{x}_3^{s^T} \overline{x}_3^s \end{pmatrix} \begin{pmatrix} \overline{x}_2^{s^T} \\ \overline{x}_3^{s^T} \end{pmatrix} \overline{x}_1^s \quad [5]$$

$$\overline{x}_m^1 = (x(i, j-m), x(i+1, j-m), \ldots, x(i+N-1, j-m))^T \quad [6]$$

$$\overline{x}_m^2 = (x(i-m, j), x(i-m, j+1), \ldots, x(i-m, j+N-1))^T$$

$$\overline{x}_m^3 = (x(i, j+m+N-1), x(i+1, j+m+N-1), \ldots,$$
$$(x(i+N-1, j+m+N-1)))^T$$

$$\overline{x}_m^4 = (x(i+m+N-1, j), x(i+m+N-1, j+1), \ldots,$$
$$(x(i+m+N-1, j+N-1)))^T$$

Utilizing the detected coefficient of the linear predictor, the spatial correlation at the boundary between the lost block and the neighboring blocks can be predicted and the predicted spatial correlation value can be increased using a cost function extended to neighboring pixel regions. For interlaced sequences, there is a strong spatial correlation between fields having the same parity, i.e. even fields or odd fields. This correlation can be measured and used to obtain an excellent performance in the interlaced sequence.

More particularly, the current frame is classified into I-picture and P/B-picture, to better estimate an optimal motion vector. For I-pictures, an optimal motion vector which minimizes equation [4] within a searching range ±SR is found at the location of the currently lost block because the neighboring blocks have no motion vector (step S6). The I-picture is important because it is the reference of other frames. For P-picture and B-picture, the optimal motion vector among the candidate motion vectors is estimated using Equation [4] (step S6), where the candidate vectors are as follows:

1) zero motion vector;
2) average motion vector o neighboring blocks;
3) motion vector of each neighboring block; and
4) median vector of each neighboring block.

Therefore, if the picture coding type s an I-picture, the optimal motion vector is the vector which minimizes Equation [4] within the search range. However, if the picture coding type is a P-picture or B-picture, the optimal motion vector is estimated among the candidate motion vectors also by Equation [4]. Accordingly, the lost block is replaced by the block of the previous frame using the optimal motion vectors estimated based upon the picture coding type and picture characteristics (step S7).

Referring back to step S3, if the values of DM=|MF$_t$-MF$_{t-1}$| and DV=|VF$_t$-VF$_{t-1}$| exceed the critical values, the controller 1 determines that a scene change is in the frame and selects the spatial prediction compensation (step S8). The controller 1 employs the spatial prediction compensation method in P-picture and B picture for a block whose neighboring blocks are coded in intra-mode because of intensity variations within a picture.

In the present invention, the spatial prediction compensation method compensates the pixel values in the lost block in the spatial domain using an interpolation filter. For rapid and efficient spatial filtering, the controller 1 preferably Fast-Discrete-Cosine-Transform (FDCT) converts neighboring blocks C1–C4 and interpolates the FDCT-converted neighboring blocks in the frequency domain.

Particularly, each of the neighboring macro blocks of 16×16 is divided into blocks of size 8×8, and the lost macro block is also divided into four 8×8 blocks E11, E12, E21 and E22, as shown in FIG. 5. The lost macro block is then compensated using the appropriate DCT coefficients of blocks {C11, C12, C21, C22, C31, C32, C41, C42} which is closely adjacent to the lost subblocks. This allows the use of a conventional DCT converter, thereby reducing the amount of calculations for each macro block and even allowing parallel processing. Furthermore, by compensating the lost macro block in four subblocks, the local image characteristic of the macro block can be more accurately compensated.

In other words, while an 8×8 DCT conversion is executed for available 8×8 blocks neighboring the lost block, only 4×4 coefficients of lower frequency band are necessary in the 8×8 DCT conversion region to compensate the lost block using the average of the coefficients (step S9). For example, in order to reconstruct a subblock E11 of the lost block, the DCT coefficients of blocks C11 and C21 are 8×8 DCT-converted, and the average of 4×4 coefficients in the low frequency domain is inverse-DCT-converted (steps S10 and S11). The pixel value finally obtained is clipped in the dynamic range of the picture to be reconstructed. The remaining subblocks E12, E21 and E22 are also reconstructed through an analogous process as the subblock E11.

However, because a moving picture may have a large DF, the controller 1 may not recognize that there is a scene change. In such case, the error concealment unit 6 carries out the temporal compensation rather than the spatial compensation, thereby producing a satisfactory result. Accordingly, the error concealment unit 6 can reduce erroneous judgment using statistical characteristics in the picture. The critical values can be obtained using statistical characteristics of frames which were previously decoded without error. For example; the error concealment unit 6 uses statistical values between the I-picture and P-picture or the I-picture and B-picture at a moment when a Group of Picture (GOP) begins. Furthermore, the error concealment unit 6 may use statistical values of a picture currently being decoded without any error. Accordingly, the error concealment unit 6 can more accurately estimate the variation between scenes and adaptively use the error concealing methods according to the characteristics of pictures.

Furthermore, a block deterioration may be generated when the temporal and spatial prediction error concealing methods are employed. Such block deterioration is caused by quantization error between blocks at the boundary or mismatched blocks. As this is unpleasant to the eye, low pass filtering is carried out along the boundary of the substitute block, i.e. the block which replaces the lost block, (step S7) to compensate the deterioration. At this time, pixels corresponding to the boundary of the lost block are replaced by an average value calculated by Equation [7] in order to reduce the amount of calculations.

$$\overline{X}_0 = \frac{\overline{X}_0 + X_1}{2} \quad [7]$$

Here, $\overline{X}_0$ represents a value of a pixel corresponding to a lost pixel located at the boundary in the substitute block, and $X_1$ represents a pixel value adjacent to the pixel corresponding to a lost pixel at the boundary in a neighboring block.

As described above, the error concealing method according to the present invention compensates errors being generated or the channel using spatial/temporal correlation of the blocks surrounding the lost block at the receiver, thereby preventing deterioration of the picture quality.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for concealing errors comprising:
    (a) extracting a picture coding type from among I-picture, P-picture and B-picture coding types of an input frame in which an error is generated by searching for coding modes of available neighboring blocks in a current frame to determine characteristics of a bitstream currently being decoded, and obtaining picture characteristics of the input frame, wherein said obtaining the picture characteristics by the following equation where $C_t(k)$ for $\{k=1, \ldots, m\}$ represents neighboring blocks of a block with an error in the input frame at time t and m indicates a number of available neighboring blocks;

$$DF = \sum_{k=1}^{m} |C_t(k) - C_{t-1}(k)|$$

(b) selecting an error concealing method from one of a plurality of error concealing methods depending upon the picture coding type extracted from among I-picture, P-picture and B-picture coding types and the picture characteristics wherein a temporal prediction error concealing method is selected if the value of DF is less than a first threshold value; and
    (c) compensating the input frame by concealing the error using a selected error concealing method.

2. A method of claim 1, wherein if the value of DF is not less than a predetermined reference value:
    obtaining a first mean value and a first variance value of the neighboring blocks of the frame with an error;
    obtaining a second mean value and a second variance value of blocks in corresponding positions of the neighboring blocks in a previous frame; and
    selecting the temporal prediction error concealing method if a difference between the first and second mean values, and a difference between the first and second variance values are within second threshold values.

3. A method for concealing errors comprising:
    (a) extracting a picture coding type from among I-picture, P-picture and B-picture coding types of an input frame in which an error is generated by searching for coding modes of available neighboring blocks in a current frame to determine characteristics of a bit stream currently being decoded, and obtaining picture characteristics of the input frame;

(b) selecting an error concealing method from one of a plurality of error concealing methods depending upon the picture coding type extracted from among I-picture, P-picture and B-picture coding types and the picture characteristics, wherein a temporal prediction error concealing method is selected when the frame has a strong temporal correlation, and a spatial prediction error concealing method is selected when the frame has a weak temporal correlation, said spatial prediction error concealing method using a frequency domain interpolation method, wherein the frequency domain interpolation method comprises:

dividing a block with an error in the input frame into first subblocks and dividing each neighboring block of the block with an error into second subblocks;

DCT-converting, for each of the first subblocks, the second subblocks neighboring a corresponding one of a first subblock; and inverse-DCT-converting, for each DCT-converted second subblocks, an average value of coefficients in a low frequency band to obtain pixel values of a corresponding first subblock; and (c) compensating the input frame by concealing the error using a selected error concealing method.

4. A method for concealing errors comprising:

(a) extracting a picture coding type from among I-picture, P-picture and B-picture coding types of an input frame in which an error is generated by searching for coding modes of available neighboring blocks in a current frame to determine characteristics of a bitstream currently being decoded, and obtaining picture characteristics of the input frame;

(b) selecting an error concealing method from one of a plurality of error concealing methods depending upon the picture coding type and the picture characteristics wherein a spatial prediction error concealing method is selected when the frame has a weak temporal correlation, and a temporal prediction error concealing method is selected when the frame has a strong temporal correlation, said temporal prediction error concealing method using a new cost function to predict a temporal correlation between a block with an error in the input frame and neighboring blocks of the block with an error, wherein an optimal motion vector to compensate the block with an error is obtained by a vector which minimizes the following equation, $$(V_x^*, V_y^*) = \mathrm{argmin}(V_x, V_y) \in S \sum_{s=1}^{4} D_{ij}^s(V_x, V_y) + \lambda E_{ij}^s(V_x, V_y)$$

when $$D_{ij}^1(V_x, V_y) = \sum_{k=0}^{N-1} \left( x^1(i+k+V_x, j+V_y) - \sum_{m=0}^{\omega} a_m^1 x(i+k, j-m) \right)^2$$

$$D_{ij}^2(V_x, V_y) = \sum_{k=0}^{N-1} \left( x^1(i+V_x, j+k+V_y) - \sum_{m=0}^{\omega} a_m^2 x(i-m, j+k) \right)^2$$

$$D_{ij}^3(V_x, V_y) = \sum_{k=0}^{N-1} \left( x^1(i+k+V_x, j+N-1+V_y) - \sum_{m=0}^{\omega} a_m^3 x(i+k, j+m+N-1) \right)^2$$

$$D_{ij}^4(V_x, V_y) = \sum_{k=0}^{N-1} \left( x^1(i+N-1+V_x, j+k+V_y) - \sum_{m=0}^{\omega} a_m^4 x(i+m+N-1, j+k) \right)^2$$

$$E_{ij}^1(V_x, V_y) = \sum_{k=0}^{N-1} (x^1(i+k+V_x, j+V_y-1) - x(i+k, j-1))^2$$

$$E_{ij}^2(V_x, V_y) = \sum_{k=0}^{N-1} (x^1(i+V_x-1, j+k+V_y) - x(i-1, j+k))^2$$

$$E_{ij}^3(V_x, V_y) = \sum_{k=0}^{N-1} (x^1(i+k+V_x, j+N+V_y) - x(i+k, j+N))^2$$

$$E_{ij}^4(V_x, V_y) = \sum_{k=0}^{N-1} (x^1(i+N+V_x, j+k+V_y) - x(i+N, j+k))^2$$

wherein x(i,j) represents luminance values of pixels of top, sides and bottom blocks adjacent to a lost block, $x^1(i,j)$ represents luminance values of pixels in a previous frame corresponding to x(ij); and (c) compensating the input frame by concealing the error using a selected error concealing method.

5. A method of claim 4, wherein a coefficient of a linear predictor of the optimal motion vector is calculated by Equation [1], where a pixel value in each neighboring block is represented by Equation [2], $$\begin{pmatrix} a_1^s \\ a_2^s \end{pmatrix} = \begin{pmatrix} \bar{x}_2^{s^r} & \bar{x}_2^s & \bar{x}_2^{s^r} & \bar{x}_3^s \\ \bar{x}_3^s & \bar{x}_3^s & \bar{x}_3^{s^r} & \bar{x}_3^{s^r} \end{pmatrix} \begin{pmatrix} \bar{x}_2^{s^r} \\ \bar{x}_3^{s^r} \end{pmatrix} \bar{x}_1^s \quad [1]$$

$$\bar{x}_m^1 = (x(i, j-m), x(i+1, j-m), \ldots, x(i+N-1, j-m))^T \quad [2]$$

$$\bar{x}_m^2 = (x(i-m, j), x(i-m, j+1), \ldots, x(i-m, j+N-1))^T$$

$$\bar{x}_m^3 = (x(i, j+m+N-1), x(i+1, j+m+N-1), \ldots,$$
$$(x(i+N-1, j+m+N-1)))^T$$

$$\bar{x}_m^4 = (x(i+m+N-1, j), x(i+m+N-1, j+1), \ldots,$$
$$(x(i+m+N-1, j+N-1)))^T.$$

6. A method of claim 4, wherein the optimal motion vector is the vector which minimizes the equation for $(V_x^*, V_y^*)$ within a predetermined range if the picture coding type is an I-picture.

7. A method of claim 4, wherein the optimal motion vector is estimated among candidate motion vectors by the equation for $(V_x^*, V_y^*)$, if the picture coding type is either a P-picture or a B-picture.

8. A method of claim 7, wherein the candidate motion vectors include a zero moon vector, an average motion vector of the neighboring blocks, a motion vector of each neighboring block; and a median vector of each neighboring block.

9. A method for concealing errors comprising:

(a) extracting a picture coding type from among I-picture, P-picture and B-picture coding types of an input frame in which an error is generated by searching for coding modes of available neighboring blocks in a current frame to determine characteristics of a bit stream currently being decoded, and obtaining picture characteristics of the input frame;

(b) selecting an error concealing method from one of a plurality of error concealing methods depending upon the picture coding type extracted from among I-picture, P-picture and B-picture coding types and the picture characteristics, wherein the frame is compensated by replacing a block with an error in the frame by a substitute block in which errors are concealed using the selected error concealing method, and a post-process is performed for the substitute block, wherein the post-process includes replacing a boundary pixel of the substitute block by an average value calculated by the following equation, where $\overline{X}_0$ represents a pixel value located at the boundary of the substitute block and $X_1$ represents a pixel value adjacent to said boundary pixel at a neighboring block, $$\overline{X}_0 = \frac{X_0 + X_1}{2};$$

and
(c) compensating the input frame by concealing the error using a selected error concealing method.

* * * * *